US007583954B2

(12) United States Patent
Inagaki (10) Patent No.: US 7,583,954 B2
(45) Date of Patent: Sep. 1, 2009

(54) WIRELESS CONNECTION ESTABLISHMENT METHOD, ITS SYSTEM AND RADIO DEVICE CONTROL TERMINAL USED IN THE SAME

(75) Inventor: Fumiyuki Inagaki, Tokyo (JP)

(73) Assignee: NEC Corporation, Tokyo (JP)

( * ) Notice: Subject to any disclaimer, the term of this patent is extended or adjusted under 35 U.S.C. 154(b) by 593 days.

(21) Appl. No.: 10/986,992

(22) Filed: Nov. 15, 2004

(65) Prior Publication Data
US 2005/0130626 A1 Jun. 16, 2005

(30) Foreign Application Priority Data
Dec. 10, 2003 (JP) ............................. 2003-411133

(51) Int. Cl.
*H04M 1/66* (2006.01)
(52) U.S. Cl. .................. 455/411; 455/410; 455/41.1; 455/88; 340/539.11; 340/82.5; 340/34
(58) Field of Classification Search ............ 455/41.1, 455/88, 420, 411, 41.2, 466, 352; 709/219, 709/220; 705/51, 17; 370/352; 725/116; 340/539.1
See application file for complete search history.

(56) References Cited

U.S. PATENT DOCUMENTS

| | | | | |
|---|---|---|---|---|
| 6,477,708 | B1 * | 11/2002 | Sawa .......................... | 725/116 |
| 6,782,241 | B2 * | 8/2004 | Kobayashi .................... | 455/88 |
| 7,053,771 | B2 * | 5/2006 | Hussmann ............. | 340/539.11 |
| 2001/0049268 | A1 * | 12/2001 | Kobayashi .................... | 455/88 |
| 2003/0191825 | A1 * | 10/2003 | Miyazaki et al. ............ | 709/220 |
| 2004/0006607 | A1 * | 1/2004 | Kanada et al. .............. | 709/219 |
| 2004/0137921 | A1 * | 7/2004 | Valloppillil et al. ......... | 455/466 |
| 2004/0193499 | A1 * | 9/2004 | Ortiz et al. ..................... | 705/17 |
| 2004/0203355 | A1 * | 10/2004 | Light et al. ................ | 455/41.1 |
| 2004/0264441 | A1 * | 12/2004 | Jalkanen et al. ............. | 370/352 |
| 2005/0014468 | A1 * | 1/2005 | Salokannel et al. ........ | 455/41.2 |

(Continued)

FOREIGN PATENT DOCUMENTS

JP 2001-309440 11/2001

(Continued)

OTHER PUBLICATIONS

Japanese Office Action issued Feb. 28, 2006 (with English translation of relevant portion).

*Primary Examiner*—Charles N Appiah
*Assistant Examiner*—Michael T Vu
(74) *Attorney, Agent, or Firm*—Dickstein Shapiro LLP (57) ABSTRACT

The invention provides a wireless connection establishment method enabling determination of a transmission format while giving consideration to security when conducting a connection establishment needed to send and receive multimedia information between radio devices having a radio communication function. In the invention, a radio device control terminal requests an authentication server to conduct authentication with respect to radio devices requesting a connection and then an authentication process is performed by the authentication server. When the radio devices are authenticated properly, the radio device control terminal acquires each transmission format of the radio devices from an information management server to determine a radio transmission format common to these radio devices. The radio transmission format thus determined is sent to the radio devices, so that the radio devices establish a wireless connection with each other by use of the radio transmission format.

8 Claims, 11 Drawing Sheets

U.S. PATENT DOCUMENTS

2005/0144136 A1 * 6/2005 Murashita .................... 705/51

FOREIGN PATENT DOCUMENTS

| JP | 2001-345817 | 12/2001 |
| JP | 2003-47060 | 2/2003 |
| JP | 2003-150478 | 5/2003 |
| JP | 2003-304252 | 10/2003 |

* cited by examiner

RADIO TRANSMISSION
FORMAT

NAME : RADIO DEVICE 1a

MPEG2 : 2 ~ 4Mbps
MPEG4 : 2Mbps

FIG. 10

FIG. 11

WIRELESS CONNECTION ESTABLISHMENT METHOD, ITS SYSTEM AND RADIO DEVICE CONTROL TERMINAL USED IN THE SAME

BACKGROUND OF THE INVENTION

1. Field of the Invention

The present invention relates to a wireless connection establishment method, its system, a radio device control terminal used therein and a program for controlling the operation of the control terminal, and more particularly to a wireless connection establishment system needed for audio and video devices, each having radio communication function, to exchange multimedia information, such as audio and video information, with each other.

2. Description of the Prior Art

Conventionally, a wireless connection must be established (set up) for audio and video devices, each having radio communication function, to exchange multi media information, such as audio and video information, with each other. As an example of such a wireless connection establishment, there has been known a method that establishes via a radio device control terminal a connection between radio devices which are audio and video devices (Japanese Patent Laid-Open No. 2001-345817, for example).

In this wireless connection establishment method, there exist a plurality of radio devices requesting a wireless connection establishment, a radio device control terminal reads an identifier set for each radio device and sends the identifier thus read to the radio devices so that the radio devices exchange information needed for establishing a connection with each other. Accordingly, a connection establishment can be conducted between the plurality of radio devices.

According to the prior art described above, an identifier set for each radio device is exchanged via a radio device control terminal between a plurality of radio devices requesting a wireless connection establishment, and therefore the identifier set for each radio device, which can be read by the radio device control terminal, can also be read by another radio device control terminal, so that a wireless connection can be established with an unintended radio device by exchanging the identifier. This causes a security problem. Furthermore, in some cases, when establishing a wireless connection, a user is required to perform a complex operation, such as inputting a PIN (Personal Identifier Number) code, etc.

In addition, there are cases where there exist multiple transmission formats with which the radio devices are compatible. In those cases, when establishing a connection between the radio devices, a transmission format must be determined in which multimedia information including video and audio information is transmitted between the radio devices. The prior art described above, however, makes no reference to a transmission format determination function.

Accordingly, an object of the present invention is to provide a wireless connection establishment method and its system enabling determination of a transmission format while giving consideration to security when conducting a connection establishment needed to send and receive multimedia information between radio devices having a radio communication function and also to provide a radio device control terminal used in the system and a program for controlling the operation of the control terminal.

BRIEF SUMMARY OF THE INVENTION

The wireless connection establishment method according to the present invention, which controls a wireless connection establishment to send and receive information between a plurality of radio devices by use of radio communication, comprising: a step of acquiring each ID number of the radio devices and sending the ID number to an authentication server via a communication network, in a radio device control terminal; a step of performing an authentication process with respect to each radio device based on each of the ID numbers and sending an authentication result to the radio device control terminal, in the authentication server; a step of sending the ID number via the communication network to an information management server based on the authentication result, in the radio device control terminal; a step of reading, based on each of the ID numbers, each radio transmission format of the radio devices from a storage unit for preliminarily storing each radio transmission format of the radio devices and sending each radio transmission format to the radio device control terminal, in the information management server; and a step of determining a radio transmission method employed between the radio devices based on each of the radio transmission formats, in the radio device control terminal.

The wireless connection establishment system according to the present invention, which controls a wireless connection establishment to send and receive information between a plurality of radio devices by use of radio communication, comprises: an authentication server having receiving means for receiving each ID number acquired by a radio device control terminal from the radio devices via a communication network and means for performing an authentication process with respect to each of the radio devices based on each of the ID numbers and sending an authentication result to the radio device control terminal; and an information management server having receiving means for receiving via the communication network the ID number sent by the radio device control terminal based on the authentication result acquired from the authentication server and means for reading, based on each of the ID numbers, each radio transmission format of the radio devices from a storage unit for preliminarily storing each radio transmission format of the radio devices and sending each radio transmission format thus read to the radio device control terminal, wherein the radio device control terminal comprises means for determining a radio transmission method employed between the radio devices based on each of the radio transmission formats.

The radio device control terminal according to the present invention, which controls a wireless connection establishment to send and receive information between a plurality of radio devices by use of radio communication, comprises: means for acquiring each ID number from the radio devices to send it to an authentication server via a communication network and at the same time sending the ID number to an information management server via the communication network based on the authentication result received from the authentication server; and means for determining a radio transmission method employed between the radio devices based on each radio transmission format of the radio devices received from the information management server.

The program according to the present invention, which enables a computer to execute an operation of a radio device control terminal controlling a wireless connection establishment to send and receive information between a plurality of radio devices by use of radio communication, comprises: a process of acquiring each ID number from the radio devices to send it to an authentication server via a communication network and at the same time sending the ID number to an information management server via the communication network based on the authentication result received from the authentication server; and a process of determining a radio transmission method employed between the radio devices based on each radio transmission format of the radio devices received from the information management server.

The operation of the invention will be described below. The radio device control terminal requests the authentication server to conduct authentication with respect to radio devices requesting a connection and then the authentication process is performed by the authentication server. When the radio devices are authenticated properly, the radio device control terminal acquires each transmission format of the radio devices from the information management server to determine a radio transmission format common to these radio devices. The radio transmission format thus determined is sent to the radio devices, so that the radio devices establish a wireless connection with each other by use of the radio transmission format. Accordingly, it is possible to construct a system having high security and also to automatically determine an optimum radio transmission method.

DETAILED DESCRIPTION OF THE PREFERRED EMBODIMENTS

Figure 1:
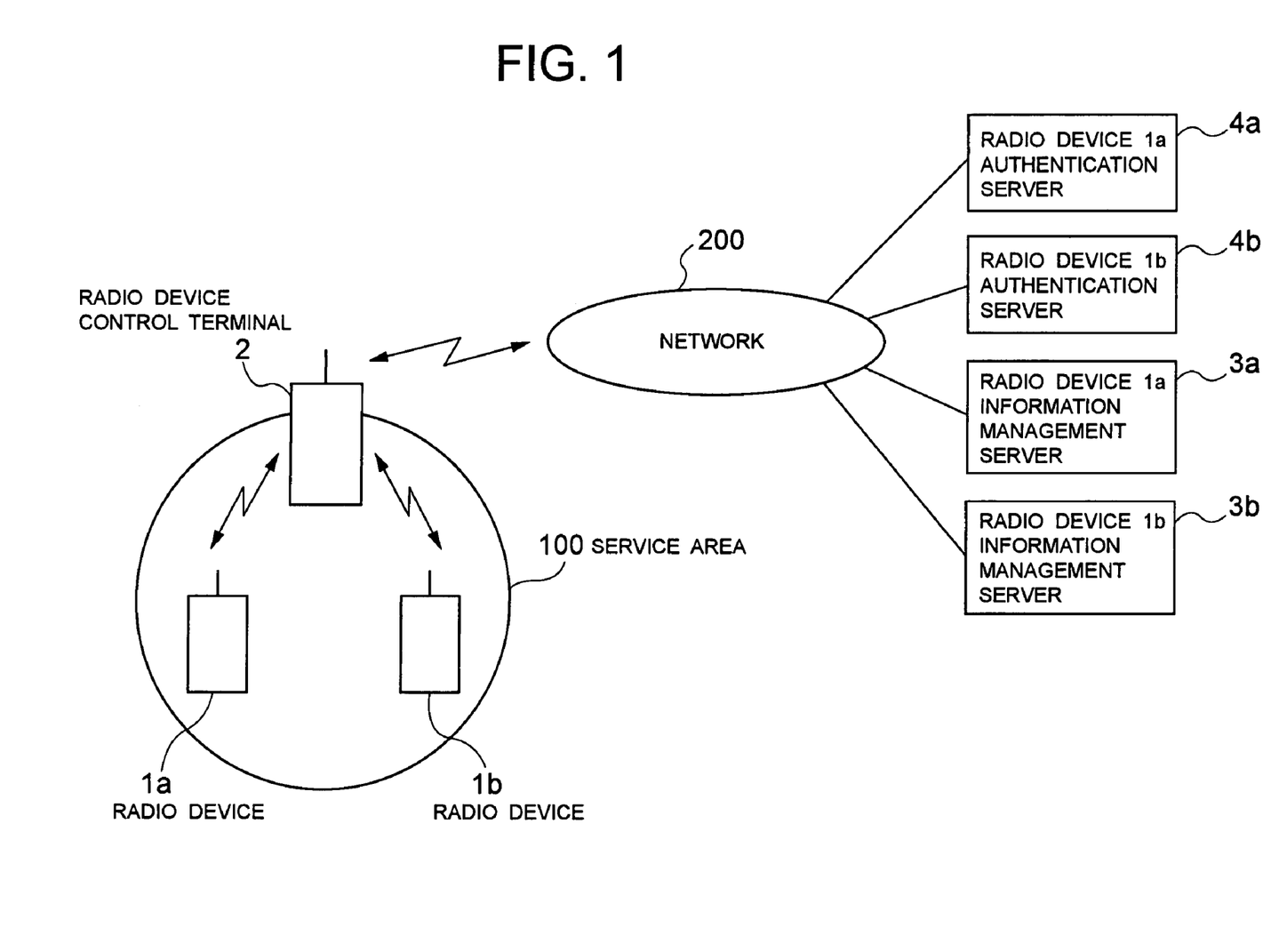
FIG. 1 is a diagram showing the system configuration according to an embodiment of the invention.

Detailed descriptions will be given below of an embodiment of the invention with reference to the drawings. FIG. 1 is a schematic block diagram showing the system configuration according to an embodiment of the invention. Referring to FIG. 1, a plurality of radio devices 1a and 1b are devices capable of sending and receiving multimedia information, such as audio and video information, with each another through a radio communication function. An example of the radio device is an audio information apparatus or video information apparatus; more specifically, a so-called audio/video apparatus having a radio communication function and used in households, etc.

A radio device control terminal 2 serves to control radio devices lying within a service area 100 as a range where a wireless connection can be conducted; the terminal 2 can communicate with the radio devices and at the same time can connect to a communication network ("network" for short) 200. As a server to manage information for establishing a connection to the radio devices, an information management server 3a for a radio device 1a and an information management server 3b for a radio device 1b are connected to the network 200. As an authentication server, an authentication server 4a for the radio device 1a and an authentication server 4b for the radio device 1b are connected to the network 200.

Figure 2:
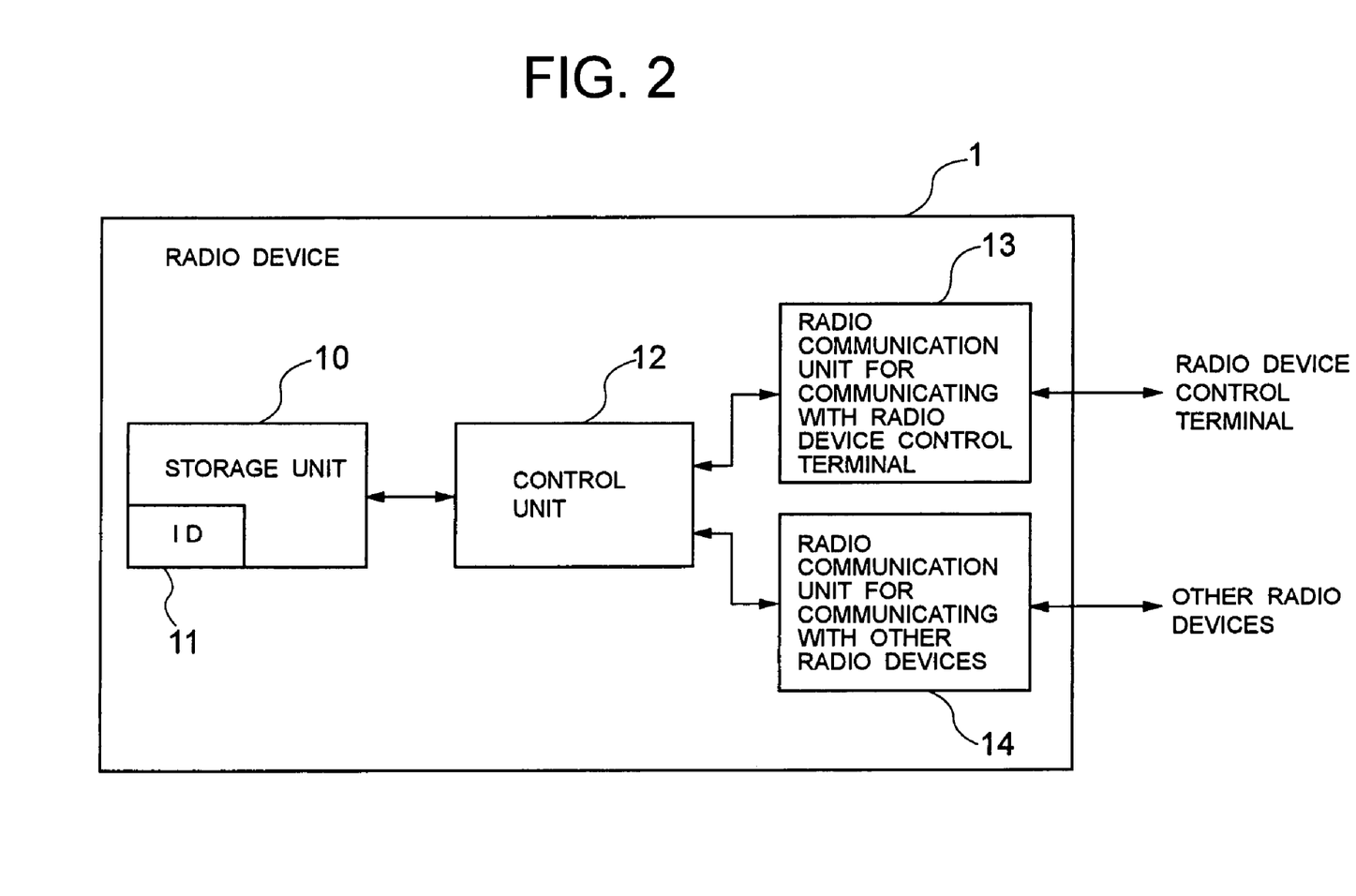
FIG. 2 is a functional block diagram of a radio device.

Regarding a part related to the embodiment of the invention, the radio devices 1a and 1b have the same configuration; its exemplary configuration is illustrated in FIG. 2. Referring to FIG. 2, the radio device includes a storage unit 10 for holding an ID number assigned to the radio device itself and a radio transmission format. As the radio device ID number, a RFID tag (radio identification tag) can be employed in the present embodiment; in this case, its ID11 is listed. The radio device further includes a radio communication unit 13 which can connect to the radio device control terminal 2. When the RFIC tag is used, the unit 13 includes a RF unit and a loop antenna. The radio device still further includes: a radio communication unit 14 which can connect to other radio devices through a transmission format sent from the radio device control terminal 2; and a control unit 12 which controls these units 10, 13, 14, etc.

Figure 3:
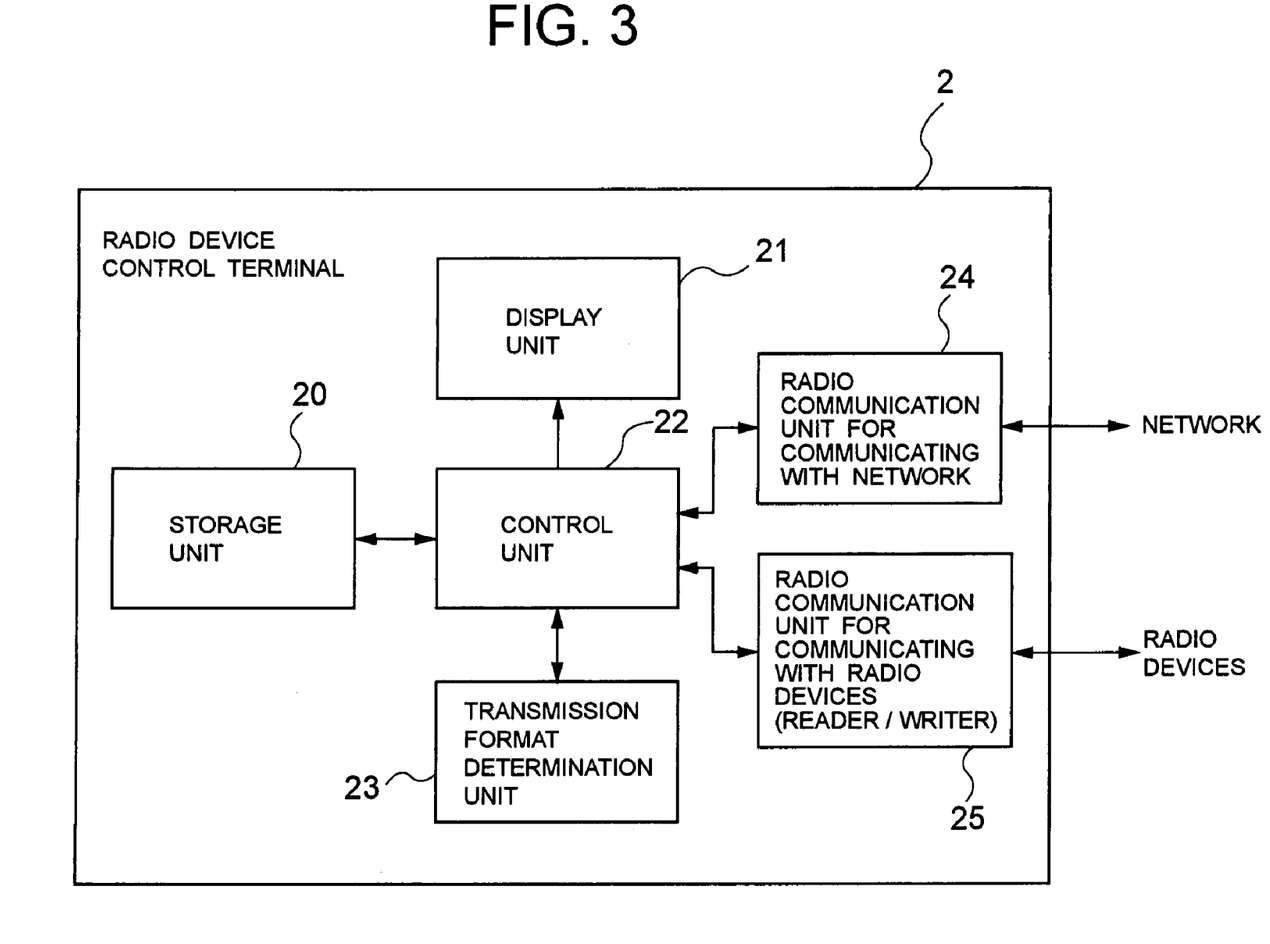
FIG. 3 is a functional block diagram of a radio device control terminal.

The radio device control terminal 2 has the service area 100 as a range where a wireless connection to the radio devices 1a and 1b can be conducted. As shown in FIG. 3, the terminal 2 includes a radio communication unit 25 which can connect to these radio devices. When the RFIC tag is used for the radio devices, the radio communication unit 25 serves as a reader/writer of the RFID tag. The radio device control terminal 2 further includes a radio communication unit 24 which connects via the network 200 to the radio device information management servers 3a, 3b and the radio device authentication servers 4a, 4b.

Furthermore, the radio device control terminal 2 includes a storage unit 20 for storing information, a display unit 21 for displaying information for a user and a transmission format determination unit 23 for determining a transmission format needed for establishing a wireless connection between the radio devices. The radio device control terminal 2 still further includes a control unit 22 which decides, based on radio device ID11, which of the radio device information management servers 3a, 3b is to be connected and which of the radio device authentication servers 4a, 4b is to be connected. The control unit 22 also controls each unit of the terminal 2.

As the radio device control terminal 2, a cellular phone can be employed, for example. In this case, the radio communication unit 24 may be an ordinary mobile communication function unit; and therefore the network 200 may be a public telecommunication network including a mobile communication network. The radio communication unit 25 includes a RFID tag reader/writer function; the reader/writer function can easily be mounted into the cellular phone.

Figure 4:
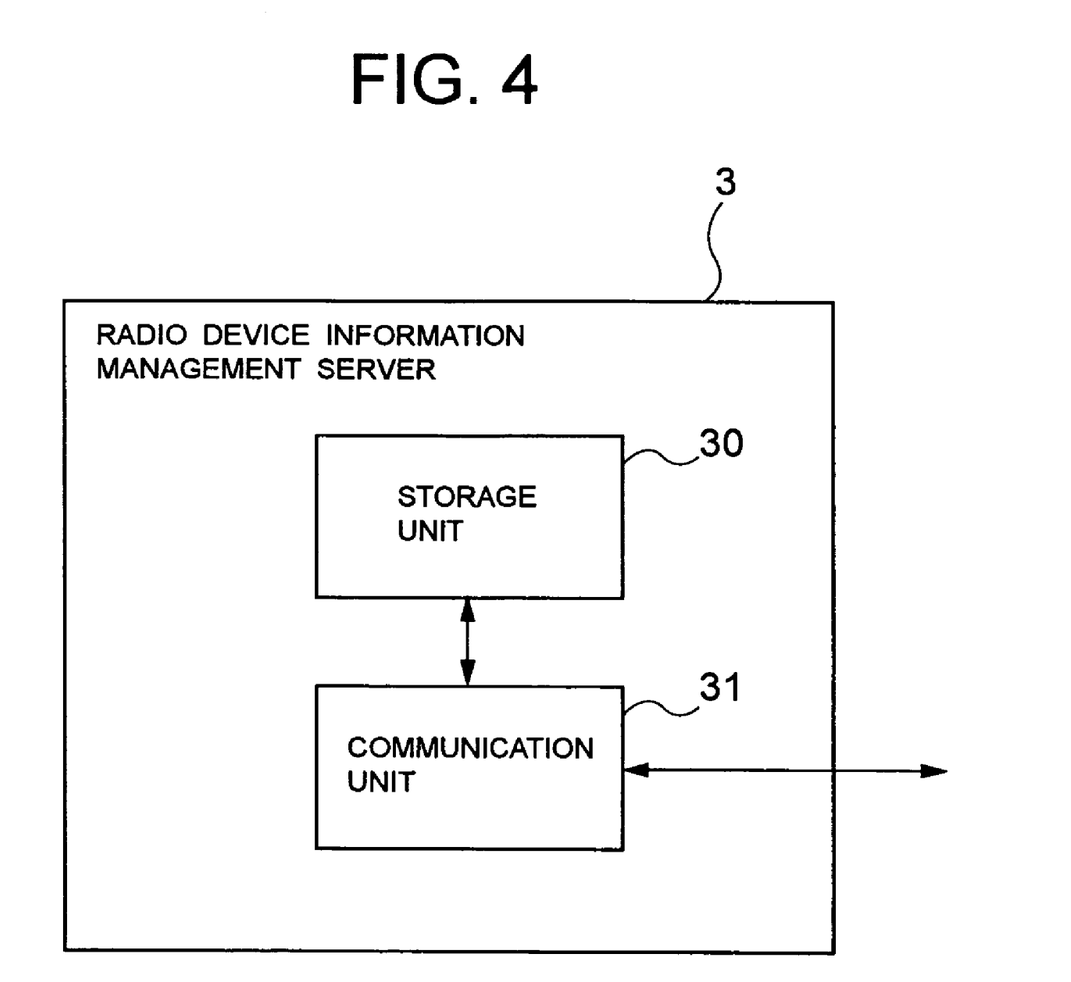
FIG. 4 is a functional block diagram of a radio device information management server.
Figure 5:
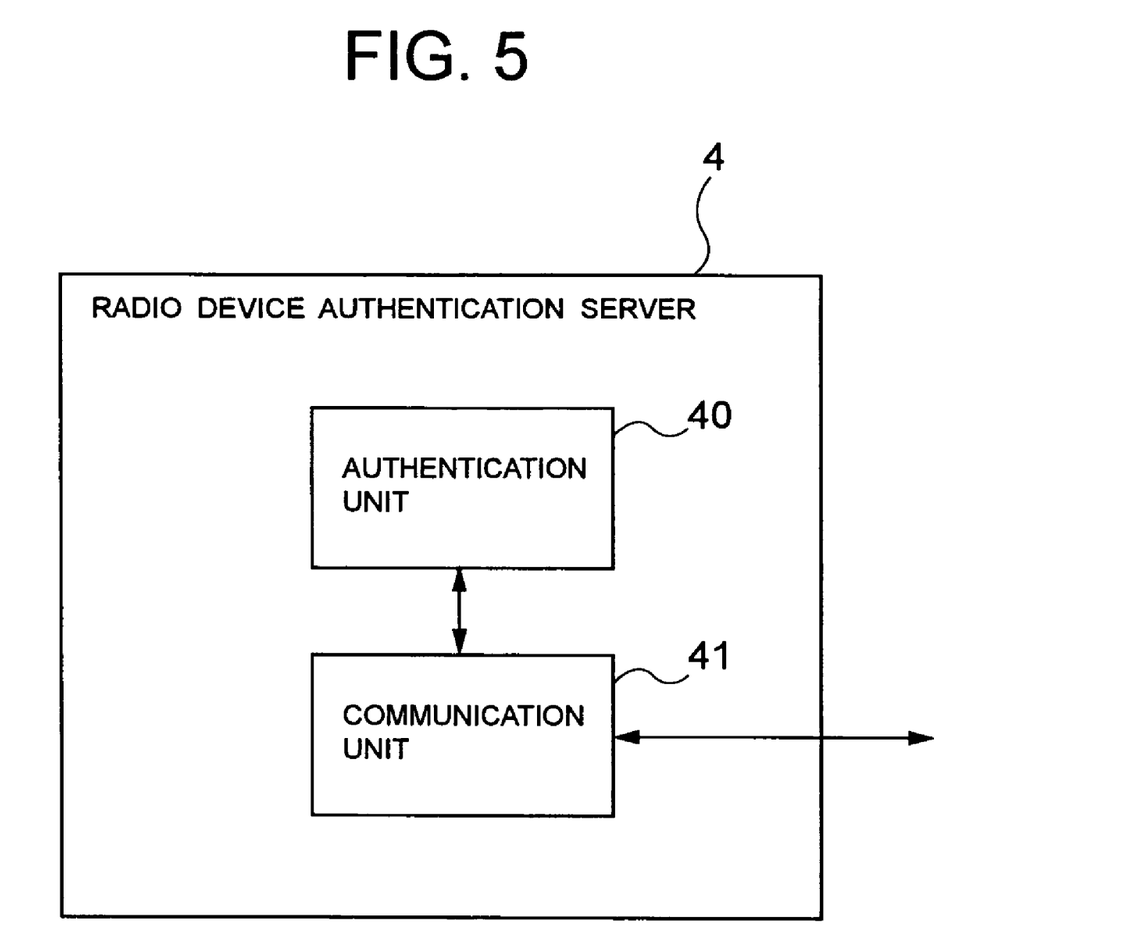
FIG. 5 is a functional block diagram of a radio device authentication server.

The radio device information management servers 3a and 3b have the same configuration. FIG. 4 shows a functional block diagram of the radio device information management server. The radio device information management server includes a storage unit 30 for storing a radio device transmission format and a communication unit 31 which connects to the radio device control terminal 2. The radio device authentication servers 4a and 4b have the same configuration. FIG. 5 shows a functional block diagram of the radio device authentication server. The radio device authentication server includes an authentication unit 40 which authenticates the radio devices, and a communication unit 41 which connects to the radio device control terminal 2.

Figure 6:
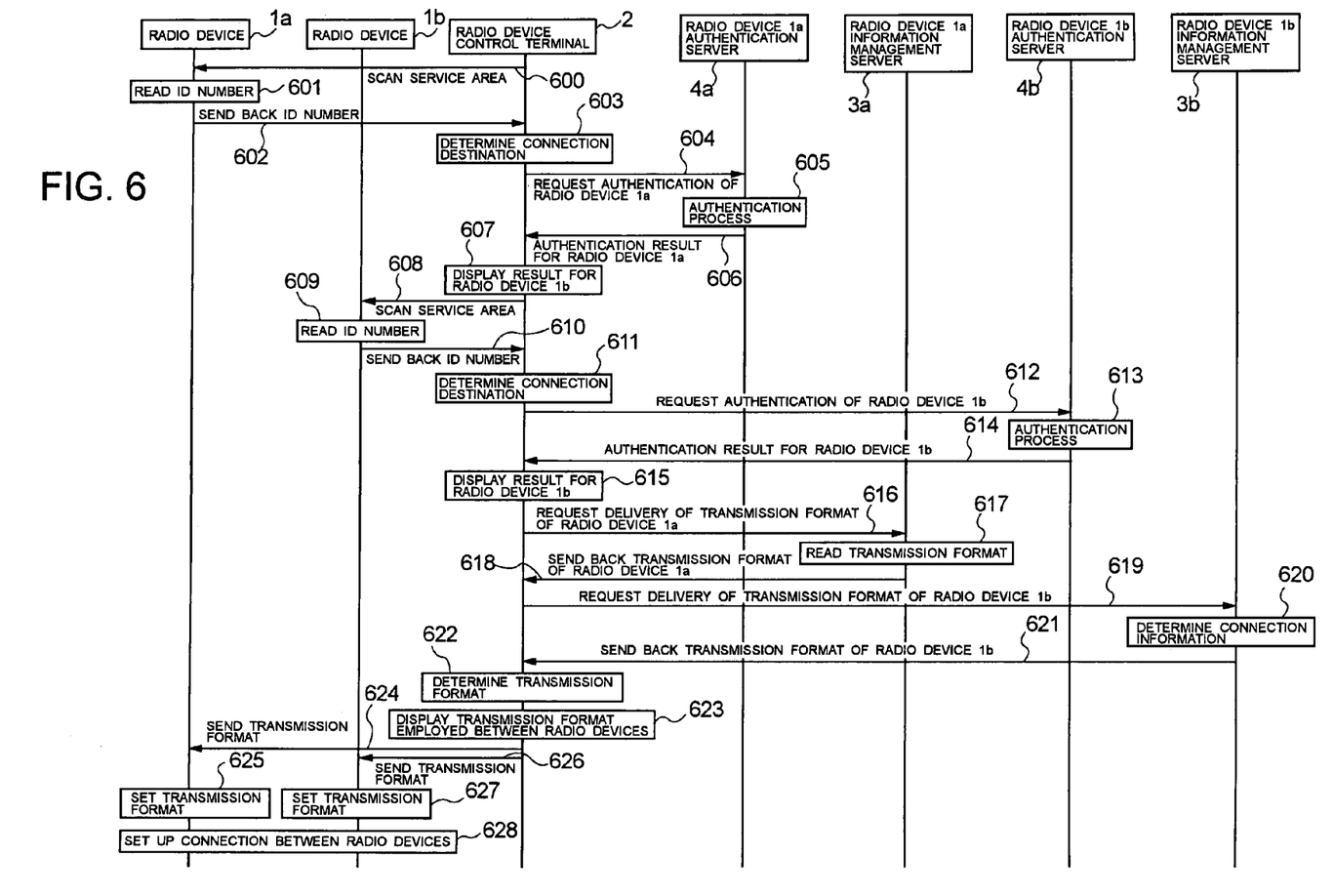
FIG. 6 is a diagram showing the operational sequence according to the embodiment of the present invention.

Next, an exemplary operational sequence of establishing a connection between the radio devices 1a and 1b shown in FIG. 1 is illustrated in FIG. 6. Referring to FIG. 6, the radio device control terminal 2 scans the service area 100 (Step 600). The radio device 1a existing in the service area 100 reads out ID11 (ID number) stored in the storage unit 10 (Step 601). ID11 (ID number) read out from the radio device 1a is sent to the radio device control terminal 2 (Step 602). Based on the ID number of the radio device 1a, the radio device control terminal 2 determines the radio device authentication server 4a (for the radio device 1a) to which a connection is to be conducted (Step 603). The radio device control terminal 2 sends the ID number of the radio device 1a to the authentication server 4a via the network 200 to request the server 4a to perform an authentication process with respect to the radio device 1a (Step 604).

Figure 7:
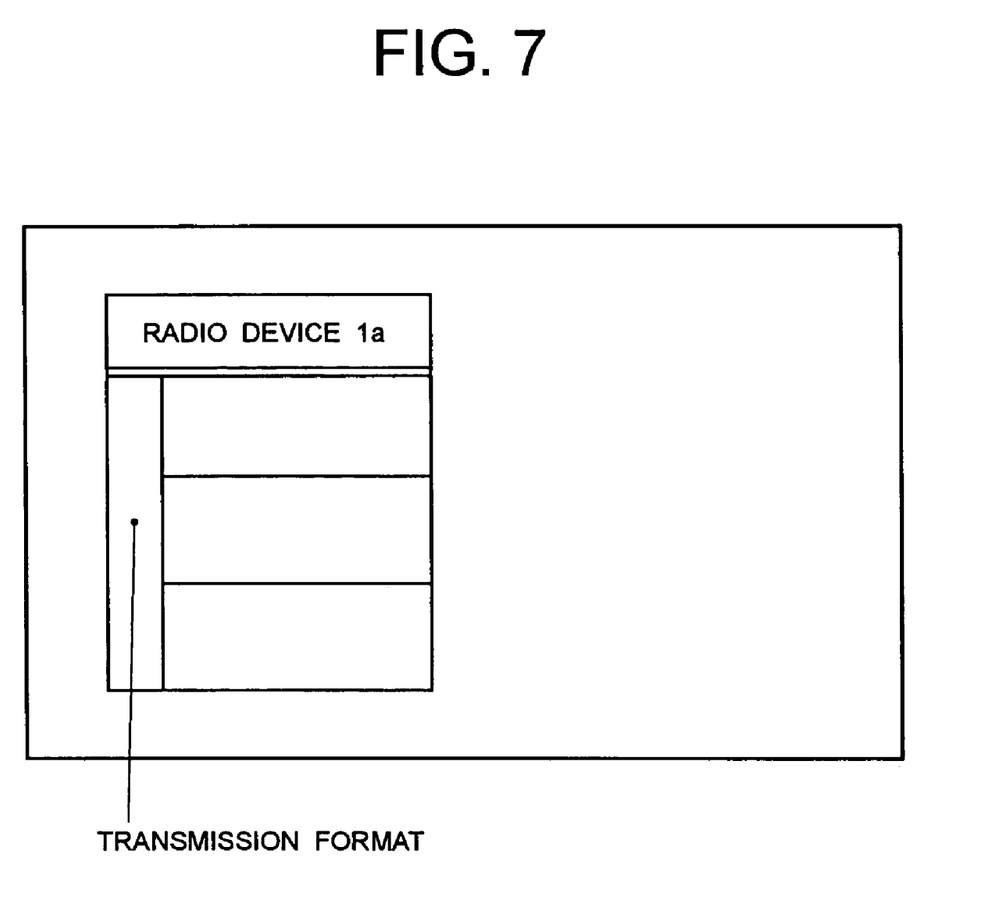
FIG. 7 is a diagram showing an exemplary authentication result of a radio device 1a displayed on a display unit of the radio device control terminal.

The radio device authentication server 4a performs the authentication process with respect to the radio device 1a based on the ID number of the radio device 1a sent from the radio device control terminal 2 (Step 605). The authentication process result from the radio device authentication server 4a is sent back to the radio device control terminal 2 (Step 606). The radio device control terminal 2 displays the sent authentication result of the radio device 1a on the display unit 21 (Step 607). An exemplary display of the authentication result is shown in FIG. 7.

Subsequently, the radio device control terminal 2 scans the service area 100 (Step 608). The radio device 1b existing in the service area 100 reads out the ID number stored in the storage unit 10 (Step 609). The ID number read out from the radio device 1b is sent to the radio device control terminal 2 (Step 610). Based on the ID number of the radio device 1b, the radio device control terminal 2 determines the radio device authentication server 4b to which a connection is to be conducted (Step 611). The radio device control terminal 2 sends the ID number of the radio device 1b to the authentication server 4b via the network 200 to request the server 4b to perform an authentication process with respect to the radio device 1b (Step 612).

Figure 8:
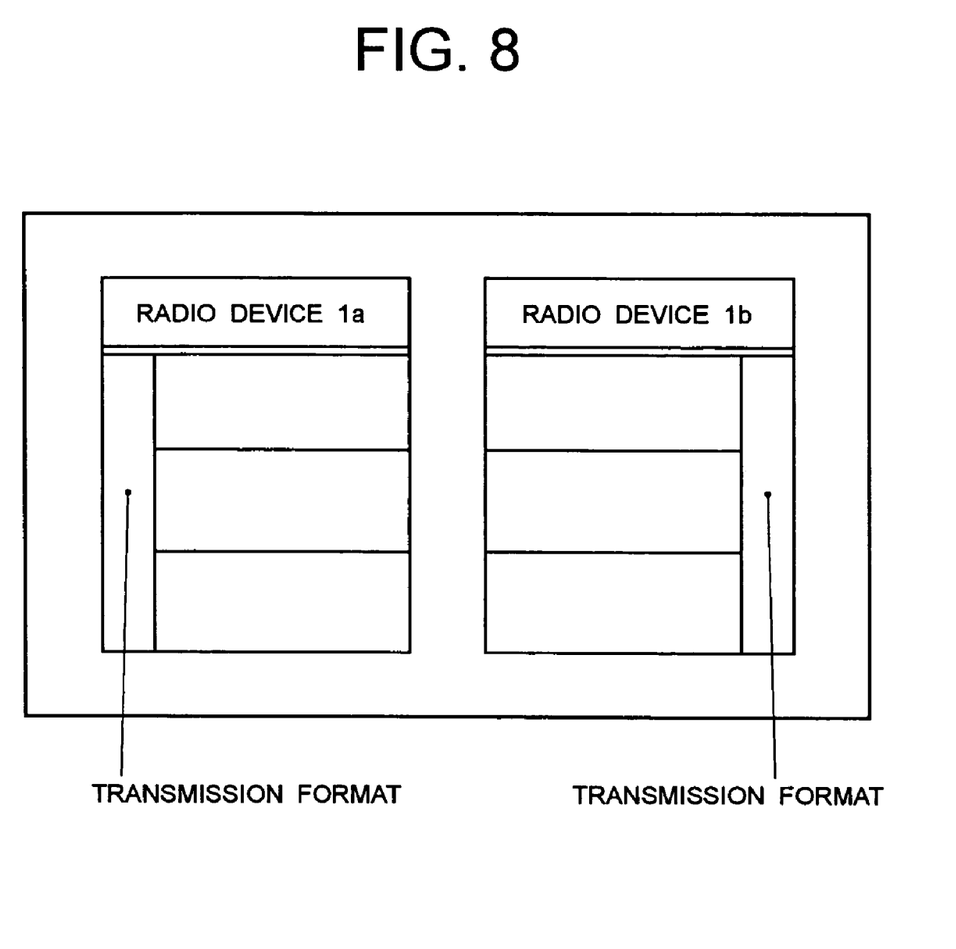
FIG. 8 is a diagram showing an exemplary authentication result of the radio devices 1a and 1b displayed on a display unit of the radio device control terminal.

The radio device authentication server 4b performs the authentication process with respect to the radio device 1b based on the ID number of the radio device 1b sent from the radio device control terminal 2 (Step 613). The authentication process result from the radio device authentication server 4b is sent back to the radio device control terminal 2 (Step 614). The radio device control terminal 2 displays the sent authentication result of the radio device 1b on the display unit 21 (Step 615). An exemplary display of the authentication result is shown in FIG. 8. In the above description, the process steps 600 to 607 for the radio device 1a are performed independently of the process steps 608 to 615 for the radio device 1b. It will easily be appreciated, however, that these process steps can be performed in parallel with each other.

Figure 9:
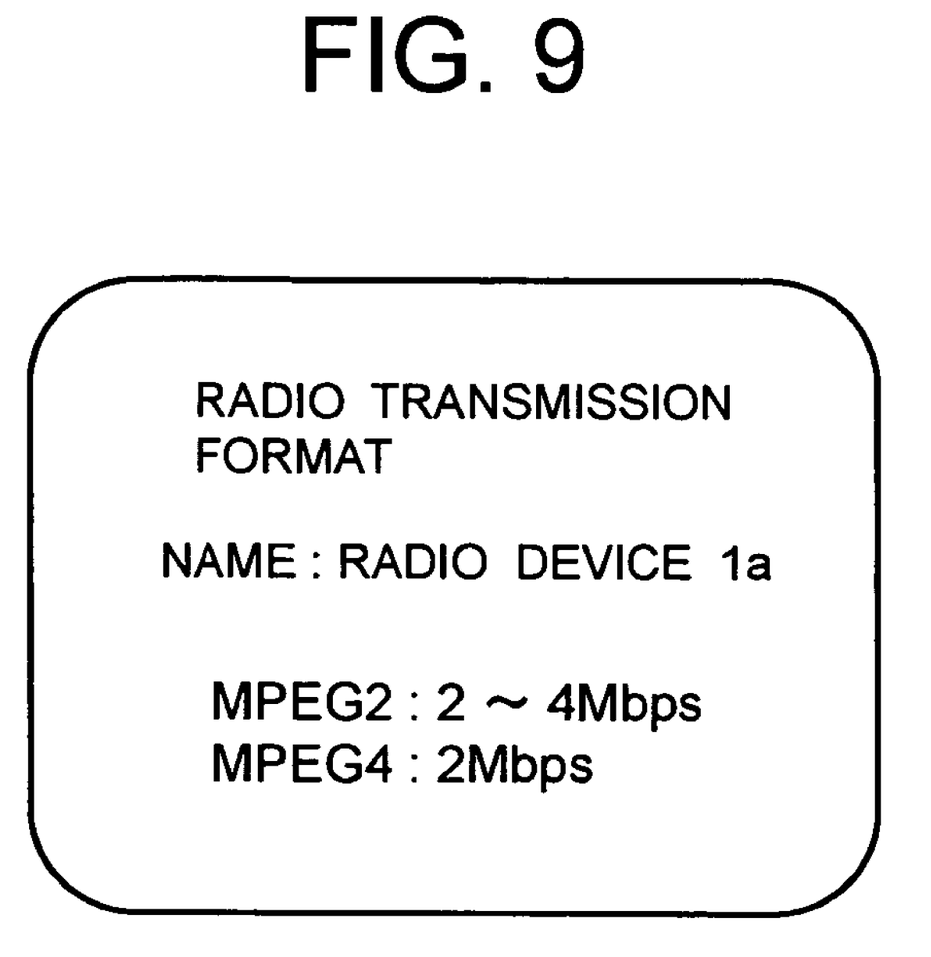
FIG. 9 is a diagram showing an exemplary radio transmission format of the radio device.

Based on the ID number of the radio device 1a, the radio device control terminal 2 specifies, by use of the control unit 22, the information management server 3a used for the radio device 1a, to which a connection is to be conducted. Then, the radio device control terminal 2 connects to the information management server 3a to request the transmission format of the radio device 1a (Step 616). The information management server 3a for the radio device 1a reads out the transmission format of the radio device 1a from the storage unit 30 (Step 617). An exemplary radio transmission format of the radio device 1a stored in the storage unit 30 is illustrated in FIG. 9. The information management server 3a for the radio device 1a sends back the transmission format of the radio device 1a to the radio device control terminal 2 (Step 618).

Subsequently, based on the ID number of the radio device 1b, the radio device control terminal 2 specifies, by use of the control unit 22, the information management server 3b used for the radio device 1b, to which a connection is to be conducted. Then, the radio device control terminal 2 connects to the information management server 3b to request the transmission format of the radio device 1b (Step 619). The information management server 3b for the radio device 1b reads out the transmission format of the radio device 1b from the storage unit 30 (Step 620). The information management server 3b for the radio device 1b sends back the transmission format of the radio device 1b to the radio device control terminal 2 (Step 621).

Figure 10:
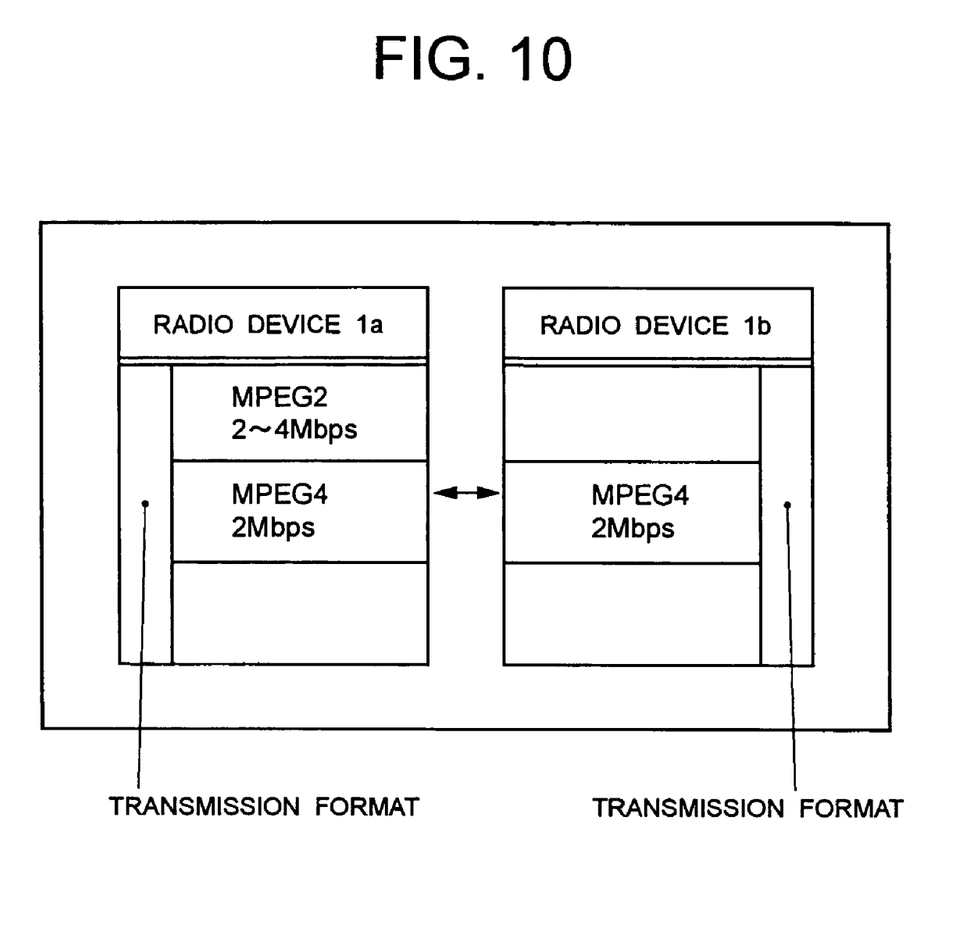
FIG. 10 is a diagram showing an exemplary display screen of a wireless connection determination obtained by use of device information of the radio devices 1a and 1b displayed on the display unit of the radio device control terminal.

The radio device control terminal 2 acquires the transmission formats of all the radio devices between which a wireless connection is to be conducted, and by use of the transmission format determination unit 23 determines a radio transmission format with the highest data transfer rate, which is implementable between the radio devices 1a and 1b (Step 622). By use of the display unit 21, the radio device control terminal 2 informs a user of the radio transmission format thus determined (Step 623). An exemplary display of the radio device control terminal 2 determining the radio transmission format is illustrated in FIG. 10.

The radio device control terminal 2 sends the determined radio transmission format to the radio device 1a (Step 624). The radio device 1a stores the sent radio transmission format into the storage unit 10. Using the radio transmission format, the control unit 12 controls the radio communication unit 14 (Step 625). The radio device control terminal 2 sends the determined radio transmission format to the radio device 1b (Step 626). The radio device 1b stores the sent radio transmission format into the storage unit 10. Using the radio transmission format, the control unit 12 controls the radio communication unit 14 (Step 627).

When both of the radio devices 1a and 1b requesting a wireless connection establishment finish the setting of the radio transmission format, it becomes possible to establish the wireless connection between the radio devices 1a and 1b (Step 628).

As described above, according to the embodiment, the radio device control terminal 2 scans the radio devices 1a and 1b in the service area 100 and reads out the radio device ID numbers. Then, based on the radio device ID numbers, the radio device authentication server 4a and 4b are automatically connected by the control unit 22 to obtain authentication. Consequently, a user can save an authentication operation for the radio devices 1a and 1b. In addition, according to the present embodiment, the use of the radio device authentication server 4 enables the construction of a higher security authentication system such as client authentication, etc.

In addition, according to the present embodiment, the radio device control terminal 2 has a transmission format determination unit which automatically connects to the radio device information management server 3 based on the ID numbers of the radio devices 1a and 1b to acquire the transmission format, including compression scheme and transmission rate, which is needed for establishing the connection between the radio devices 1a and 1b, and to determine the transmission format. Consequently, it is possible to select an optimum data transmission format for establishing a connection between the radio devices.

According to the embodiment described above, the radio device information management server 3 and radio device authentication server 4 are described as an independent server separate from each other. It is evident, however, that the two servers may be constructed as a single server which controls the radio device information in an integrated manner. It is also evident that all of the servers provided for each radio device may be integrated into a single server.

Figure 11:
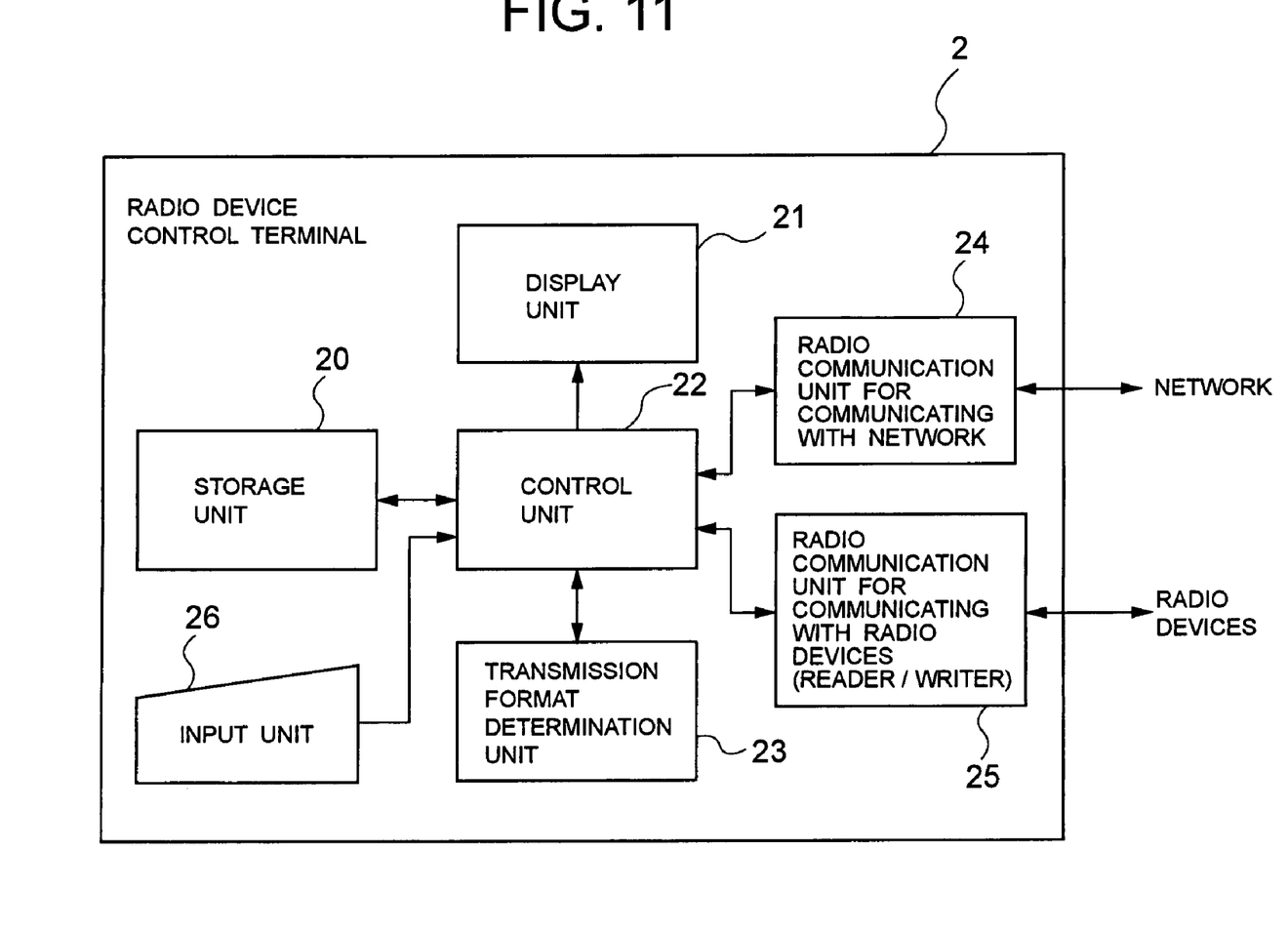
FIG. 11 is another functional block diagram of the radio device control terminal.

FIG. 11 is a functional block diagram of the radio device control terminal 2 according to another embodiment of the invention. In FIG. 11, the same reference numerals are applied to parts corresponding to FIG. 3. In this embodiment, an input unit 26 is added to the configuration shown in FIG. 3, other units being the same as those of the above described embodiment. The input unit 26 is used for a user to conduct an input operation to determine a radio transmission format based on contents displayed on the display unit 21. Accordingly, a user can select a data transmission format at his discretion when establishing a connection between radio devices.

More specifically, referring to FIG. 6 showing the operational sequence, Steps 600 to 621 are automatically performed and then, based on displayed contents shown in FIG. 10, a user can select a desired radio transmission format from the radio transmission formats common to the two radio devices by use of the input unit 26.

In this configuration, if a rule for determining a radio transmission format is set into the transmission format determination unit 23 in advance by use of the input unit 26, when the transmission format determination unit 23 determines a radio transmission format, the determination may be automatically conducted according to the rule, thereby saving a user operation.

When a mobile communication terminal such as a cellular phone is, as described above, employed as the radio device control terminal 2, instead of placing the two radio devices simultaneously into the service area 100, the radio devices 1a and 1b may be individually placed into the service area 100 to set a radio transmission format for each radio device.

Regarding the operational sequence shown in FIG. 6, it will be apparent that the operational steps may be stored as a program into the storage medium of each unit in advance so that a computer (CPU: control unit) reads the program for execution.

A first advantageous effect of the invention is that labor-saving can be realized for a connection establishment between radio devices exchanging multimedia information, such as audio and video information, with each other. The reason is that, based on an ID number of radio devices, the radio device control terminal automatically performs authentication with respect to the radio devices and the acquisition of radio device transmission formats to determine an optimum radio transmission format from the transmission formats of a plurality of radio devices requesting a connection establishment, thereby reducing a user burden.

A second advantageous effect of the invention is that when a connection between radio devices exchanging multimedia information such as audio and video information is established, improved security can be realized. The reason is that the provision of a radio device authentication server enables the construction of a high security system implemented with respect to the radio devices, such as client authentication, etc.

What is claimed is:

1. A wireless connection establishment method for controlling a wireless connection establishment to send and receive information between a plurality of radio devices by use of radio communication, comprising:

a step of acquiring, in a radio device control terminal, each ID number of the radio devices and sending the ID number to an authentication server via a communication network;

a step of performing, in the authentication server, an authentication process with respect to each radio device based on each of the ID numbers and sending an authentication result to the radio device control terminal;

a step of sending, in the radio device control terminal, the ID number via the communication network to an information management server based on the authentication result;

a step of reading, in the information management server, based on each of the ID numbers, each radio transmission format of the radio devices from a storage unit for preliminarily storing each radio transmission format of the radio devices and sending each radio transmission format to the radio device control terminal; and a step of determining, in the radio device control terminal, a radio transmission method employed between the radio devices based on each of the radio transmission formats.

2. The wireless connection establishment method according to claim 1, further comprising a step of displaying each of the radio transmission formats sent from the information management server on a display unit, in the radio device control terminal.

3. The wireless connection establishment method according to claim 1, wherein the step of determining a radio transmission method is implemented in accordance with a predetermined rule.

4. The wireless connection establishment method according to claim 1, wherein the step of determining a radio transmission method is implemented in response to an instruction input from an input unit.

5. A wireless connection establishment system for controlling a wireless connection establishment to send and receive information between a plurality of radio devices by use or radio communication, comprising:

an authentication server having receiving means for receiving each ID number acquired by a radio device control terminal from the radio devices via a communication network and means for performing an authentication process with respect to each of the radio devices based on each of the received ID numbers and sending an authentication result to the radio device control terminal; and an information management server having receiving means for receiving via the communication network the ID number sent by the radio device control terminal based on the authentication result acquired from the authentication server and means for reading, based on each of the received ID numbers, each radio transmission format of the radio devices from a storage unit for preliminarily storing each radio transmission format of the radio devices and sending each radio transmission format to the radio device control terminal, wherein the radio device control terminal comprises means for determining a radio transmission method employed between the radio devices based on each of the radio transmission formats.

6. The wireless connection establishment system according to claim 5, wherein, the radio device control terminal further comprises display means for displaying each of the radio transmission formats sent from the information management server on a display unit.

7. The wireless connection establishment system according to claim 5, wherein the means for determining a radio transmission method is implemented in accordance with a predetermined rule.

8. The wireless connection establishment system in according to claim 5, wherein the means for determining a radio transmission method is implemented in response to an instruction input from an outside unit.

* * * * *

UNITED STATES PATENT AND TRADEMARK OFFICE
CERTIFICATE OF CORRECTION

PATENT NO. : 7,583,954 B2  Page 1 of 1
APPLICATION NO. : 10/986992
DATED : September 1, 2009
INVENTOR(S) : Fumiyuki Inagaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this

Fourteenth Day of September, 2010

David J. Kappos
*Director of the United States Patent and Trademark Office*